Nov. 11, 1924.
B. A. FORSYTH
1,515,247
WHEEL PULLER
Filed April 20, 1923
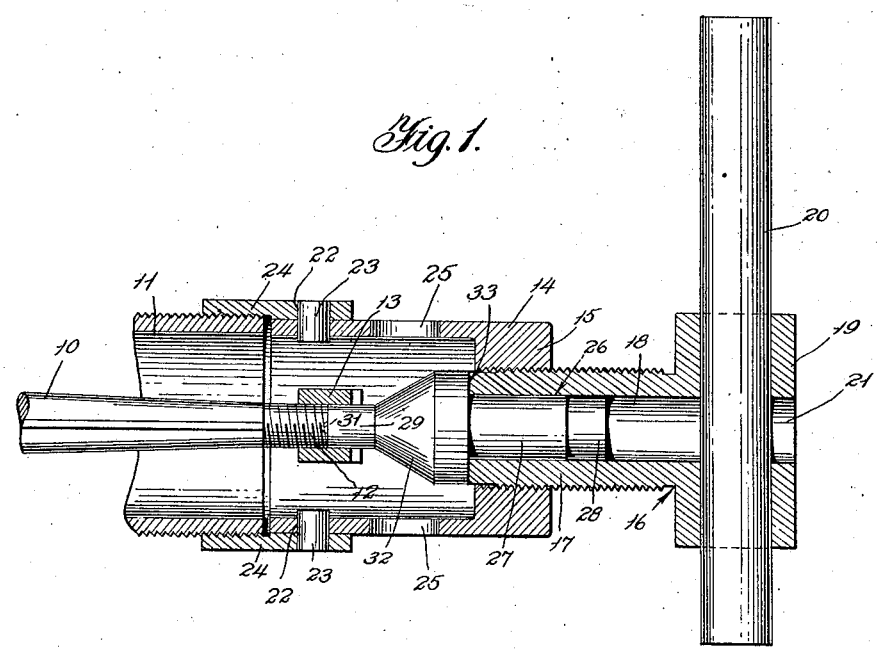
Fig. 1.
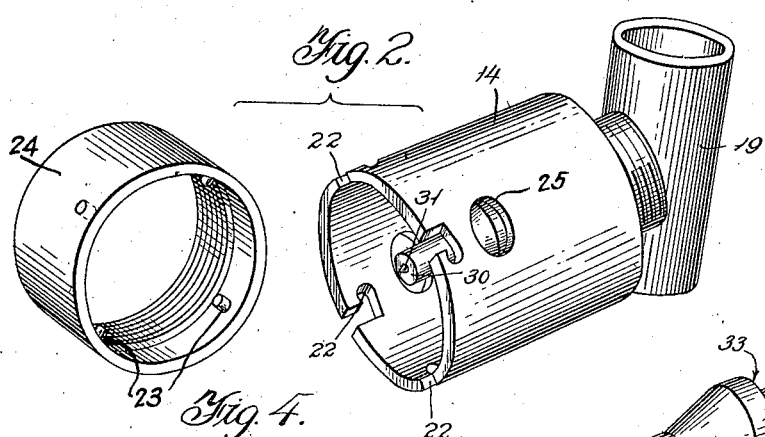
Fig. 2.
Fig. 3.
Fig. 4.
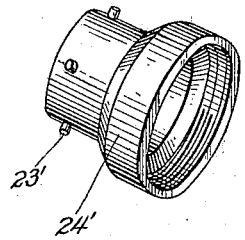
Inventor.
Burton A. Forsyth.
By
Attorneys.

Patented Nov. 11, 1924.

1,515,247

UNITED STATES PATENT OFFICE.

BURTON A. FORSYTH, OF ELMIRA, NEW YORK.

WHEEL PULLER.

Application filed April 20, 1923. Serial No. 633,515.

*To all whom it may concern:*

Be it known that I, BURTON A. FORSYTH, a citizen of the United States, and a resident of Elmira, in the county of Chemung and State of New York, have invented certain new and useful Improvements in Wheel Pullers, of which the following is a specification.

My invention relates to wheel pullers, particularly adapted for removing vehicle wheels from the axle spindles, it being the particular object of this invention to facilitate the removal of the wheel and at the same time eliminate the possibility of injury to the axle spindle or threads thereof.

The axle spindles of vehicles and particularly of motor vehicles are tapered, the hub of the wheel being usually provided with a correspondingly shaped recess which engages the tapered axle spindle whereby the wheel is wedged thereon. Under ordinary circumstances the wheel may be removed by the exertion of a steady pull or pressure thereon but in some instances where the wheel is wedged onto the axle spindle too firmly to permit its removal in this manner, it is necessary that additional efforts be exerted onto the parts to effect their disengagement. In accomplishing this with known types of wheel pullers, the parts are put under a stress directed outwardly and then the part engaging the axle spindle is rendered a sharp blow which effects the disengagement of the wheel whereupon it may be thereafter easily removed.

My improved invention relates to a wheel puller involving structural characteristics enabling the accomplishment of the above results. One of the objects of my invention resides in the provision of a plurality of connecting sleeves or collars each being quickly attachable to the wheel puller, these sleeves or collars being of sizes to engage the threaded hubs of the wheels of various standard makes of motor vehicles. In this manner my improved wheel puller is universal in use, it being rendered adaptable for use with practically any type of vehicle wheel.

Another important feature of my improved wheel puller is the releasing plunger which is made separable and removable and is so constructed as to engage the end of the axle spindle in a manner to eliminate to a great extent the possibility of mutilating or injuring the end and threads of the axle spindle. Furthermore the releasing plunger is so constructed and designed as to enable the same to withstand the strains and stresses imparted thereto when sharp blows are delivered thereon in removing the wheel.

Another novel feature of construction resides in the arrangement whereby a single bar wrench may be employed for threading the connecting sleeves or collars onto the wheel hub; for rotating the main puller member and for imparting to the releasing plunger the blow which is designed to disengage the wheel from the axle. This bar wrench therefore, has a three-fold purpose, its use eliminating the necessity for other wrenches in accomplishing these results.

The invention furthermore consists in the novel combination, construction and arrangement of parts, which will be made more apparent as this description proceeds, especially when considered in connection with the accompanying drawings, wherein:

Fig. 1 is a sectional view partly in elevation of a wheel puller constructed in accordance with my invention, Fig. 2 is a separated perspective view of the device, Fig. 3 is a detail perspective view of the releasing plunger, and Fig. 4 is a view of another form of a connection sleeve.

Referring now more particularly to the drawings wherein the reference characters indicate the like parts, it will be noted that there is illustrated the axle spindle 10 of a vehicle and a portion of the wheel hub 11 which is externally threaded in the usual manner to receive the usual hub cap (not shown). The end 12 of the axle spindle 10 is threaded as is customary to receive the nut 13 employed for holding the wheel onto the axle.

The wheel puller consists of a main sleeve-like body or member 14 one end 15 of which is closed, this end however, being centrally apertured and threaded to receive the externally threaded shank portion of a second or rotating member 16. The member 16 is substantially in the form of a T-shaped pipe member, the externally threaded shank portion 17 thereof being centrally bored as at 18 for a purpose to appear more fully hereinafter. The T head 19 of the member 16 is apertured for the reception of a bar wrench 20 which may be inserted therein and employed in rotating the member 16. The head 19 is apertured as at 21, this aperture being in alignment with the bore 18.

The open end of the member 14 is formed of a plurality of bayonet slots 22 designed for the reception of a plurality of pins 23, projecting from a coupling sleeve or collar 24. The sleeve 24 is internally threaded for engagement with the threaded portion of a hub 11, the pins 23 and slots 22 affording means for quickly and detachably connecting the member 14 to the coupling sleeve 24. The member 14 is formed with a pair of diametrically arranged openings 25 to permit the passage therethrough of the bar wrench 20 thus enabling the member 14 and sleeve 24 to be forcibly threaded on to the hub 11.

The releasing plunger is indicated by the reference character 26 and consists of a shank portion 27, the end 28 of which is slightly reduced. This portion of the releasing plunger is adapted to extend into the bore or opening 18 of the member 16. The forward end 29 of the releasing plunger terminates in an abrupt face 30 which is preferably formed with a projection 31 adapted to enter the centering recess of the axle spindle 10. The shank portion 27 of the releasing plunger merges into a beveled enlargement 32 which enlargement terminates abruptly to form a shoulder 33 designed to engage the end of the shank portion 17 of the member 16 as clearly illustrated in Fig. 1. The abrupt face 30 is provided so that a broad surface engagement may be had with the end of the axle spindle 10, while the releasing plunger is reduced as at 28 to permit of a small amount of expansion of the end of the plunger due to the strains imparted thereto when sharp blows are delivered onto its end. In this manner a small flow of the material on the end of the plunger will not cause the same to be wedged in the bore 18 of the member 16.

In using my improved device, the nut 13 thereof is preferably backed off the threaded end 12 of the axle spindle an amount substantially as indicated in Fig. 1 so that it projects beyond the end 12 of the axle spindle. This protects the threads of the end of the axle and also reinforces the same.

The sleeve 24 is then threaded on to the hub 11, this connection being facilitated by connecting the member 14 thereto by means of the pin and slot connection and then inserting the bar wrench through the aligned apertures 25 whereby the member 14 and sleeve 24 may be rotated and the sleeve 24 threaded on to the wheel hub. The bar wrench is then removed and the member 14 disengaged from the coupling sleeve and the releasing plunger 26 inserted into the bore 18 of the member 16. The member 14 is again connected to the sleeve and the bar wrench inserted through the T-head of the member 16. This member 16 is then rotated, the releasing plunger engaging the end 12 of the axle spindle with its abrupt face 30, the centering projection 31 extending into the centering recess of the axle. It should be noted that the shank 27 of the member 26 is partially surrounded by the projecting end of the nut 13 and that this nut not only protects the threads on the ends of the axle spindle, but also braces and reinforces the end to eliminate the possibility of the same becoming mutilated.

As the member 16 is rotated a pressure in an outward direction is exerted on the wheel, the stresses set up tending to axially displace the wheel relatively to the axle 10.

In some cases the pull set up by the operation of the wheel puller thus far will dislodge the wheel from the axle spindle 10 but in some cases where the axle spindle has become firmly wedged, it is impossible to dislodge the same without some additional effort. If the wheel can not thus be dislodged the bar wrench 20 is removed and inserted through the aperture 21 into the bore 18 until it engages the outer end of the releasing plunger. A sharp blow is then delivered on the end of the bar wrench which is transmitted to the releasing plunger and through it to the end of the axle, this additional force which is thus exerted tending, with the steady accumulated pressure, to dislodge the wheel from off its spindle. After the same has become dislodged, the device is then disconnected and the nut 13 removed and the wheel thus slipped off.

It will be noted that half of the bore 18 of the member 16 is left free for the insertion of the bar wrench 20, thus providing a guiding passage-way for the bar wrench so that the blow delivered on the end thereof may be squarely transmitted to the end of the releasing spindle 26 in an axial direction. This insures the transmission of this blow in a true axial direction on the end of the axle spindle 10, thus insuring a positive operation of the parts and eliminating the possibility of any parts of the device or axle becoming mutilated.

In order to adapt my improved wheel puller for universal use I contemplate employing a plurality of coupling sleeves 24 the diameter of the thread portions of which will be so selected as to enable connection to be made with the hubs of all standard makes of motor vehicles. This is suggested in Fig. 4 where a sleeve 24' is illustrated, the pins 23' of which project outwardly instead of inwardly, so that the end of the sleeve may be inserted into the open end of the member 14 when connection is made therewith, instead of surrounding the same as illustrated in Fig. 1. Obviously, in this manner a suitable number of interchangeable coupling sleeves 24 may be provided to enable connection to be made with hubs of various diameters.

It should be noted that the bar wrench 20 is employed for three distinct purposes, that is, of threading the collar 24 on to the hub, for rotating the puller 16 and for delivering the blow to the end of the releasing plunger 26. The structure of my improved puller which permits of this eliminates the necessity of using various tools for attaching and manipulating the device.

The construction of the end 29 of the member 26 providing the flat or abrupt face 30 which is adapted to engage the end of the axle spindle is such as to deliver the sharp blow to the entire end of the axle, thus eliminating the possibility of splitting or mutilating the axle. Inasmuch as the member 26 is provided with the reduced end 29, it may be inserted into the end of the nut 13 after the same has been backed halfway off the end of the axle spindle, whereby the nut may act as a protection for the end of the axle spindle and also as a guide means for the end of the releasing plunger.

The shoulder 33 formed by the abutment or enlargement 32 provides means against which the end of the rotating part of the puller may engage while the reduced end upon which the blow is delivered permits of a limited amount of expansion of flow of material before the same will become wedged in the bore of the rotatable member.

Inasmuch as the releasing plunger 26 is removable, it may be conveniently replaced when the same becomes worn or broken and may also be removed when the bar wrench is inserted in the apertures 25 when threading the collar 24 of the wheel hub. Furthermore, by making this member separate, the delivery of the blow to the axle spindle is facilitated and the shocks thereof are not imparted to the remainder of the structure.

From the foregoing it will be evident that I have described a wheel puller which may be easily and quickly manufactured without sacrificing efficiency or durability.

The wheel puller is furthermore capable of universal use and convenience of operation, owing to the fact that one tool may be employed for all of these operations.

While one embodiment of the invention has been illustrated herein in some detail, it is not intended that this invention be limited but reservation is made to make such changes as may come within the purview of the accompanying claims.

Having thus described my invention, what I claim is:

1. A wheel puller, including two relatively rotatable members having screw-threaded engagement and adapted for engagement with the hub and axle of a vehicle respectively to effect a relative longitudinal movement, means for connecting one of said rotatable members to the hub, the other rotatable member being formed with a longitudinal bore, a separate releasing plunger slideably connected to said latter rotatable member with its outer end within said bore and adapted to engage the axle with its other end, and a bar wrench insertable into said bore to apply tapping blows to said plunger.

2. A wheel puller, including two relatively rotatable members, means effecting engagement between one of said members and a wheel or other rotor, pin and slot means for detachably connecting said means to said member the other of said members being adapted for engagement with the end of an axle or spindle supporting said wheel or other rotor and a releasing plunger slideably supported by said last mentioned member and adapted for engagement with said axle or spindle.

3. A wheel puller comprising in combination a main member, a member rotatably connected therewith, a sleeve for connecting said first member with the hub of a wheel or other rotor, pin and bayonet slot means for detachably connecting said sleeve and member, a releasing plunger slideably supported by said rotatable member, said releasing plunger having a flat surface for engagement with the end of the axle spindle supporting said wheel or other rotor.

4. A wheel puller, including two members, one of said members being adapted for engagement with a wheel or other rotor, a detachable sleeve for connection with the hub of the wheel or other rotor, disengageable means for connecting said sleeve to said member, the other of said members having a threaded engagement with said first mentioned member, said latter member being formed with an axial bore, a releasing plunger slideably arranged in said bore, said releasing plunger having a shouldered portion engaging the end of said second member and a flat surface engaging the end of the axle or spindle supporting said wheel or other rotor and a bar wrench for rotating said second member and insertable in said axial bore for applying tapping blows to the end of said releasing plunger.

5. A wheel puller, comprising in combination, two members having threaded engagement with one another, a coupling sleeve adapted to engage the hub of a wheel or other rotor, detachable means for connecting one of said members to said sleeve, the second member being a substantial T-shaped pipe-like member having longitudinal and transverse communicating bores, a releasing plunger arranged in said longitudinal bore and engaging the end of the axle or spindle supporting said wheel or other rotor and a bar wrench adapted to be inserted in said transverse bore for rotating said second member and through said longitudinal bore for applying tapping blows to the end of said axle or spindle through said releasing plunger.

6. A wheel puller comprising in combination two relatively rotatable members having threaded engagement with one another, a detachable sleeve adapted to engage the hub of a wheel or other rotor, disengageable means for connecting one of said members to said sleeve, the second of said members being formed with longitudinal and transverse communicating bores, a separate releasing plunger slideably arranged in said longitudinal bore and adapted to engage the end of the axle or spindle supporting said wheel or other rotor, the first of said members being formed with a pair of oppositely positioned apertures and a bar wrench adapted to be inserted through said apertures, through said transverse bore or into said longitudinal bore for the purposes described.

The foregoing specification signed at Washington, District of Columbia, this 18th day of April, 1923.

BURTON A. FORSYTH.